(12) United States Patent
Turkel et al.

(10) Patent No.: US 7,110,997 B1
(45) Date of Patent: Sep. 19, 2006

(54) ENHANCED AD-HOC QUERY AGGREGATION

(75) Inventors: Joel Turkel, San Francisco, CA (US); Kathryn Nash, Ledbury (GB); Raghuram Venkatasubramanian, Union City, CA (US); Steve Cave, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 425 days.

(21) Appl. No.: 10/440,064

(22) Filed: May 15, 2003

(51) Int. Cl.
*G06F 17/30* (2006.01)

(52) U.S. Cl. ........................ 707/3; 707/2; 707/4; 707/5; 707/100

(58) Field of Classification Search ...................... 707/3, 707/102, 5, 4, 2, 100; 705/36 R
See application file for complete search history.

(56) References Cited

U.S. PATENT DOCUMENTS

| 5,307,484 | A | * | 4/1994 | Baker et al. | 707/102 |
| 5,414,838 | A | * | 5/1995 | Kolton et al. | 705/36 R |
| 5,590,325 | A | * | 12/1996 | Kolton et al. | 707/3 |
| 6,247,008 | B1 | * | 6/2001 | Cambot et al. | 707/3 |
| 6,633,867 | B1 | * | 10/2003 | Kraft et al. | 707/3 |
| 6,775,666 | B1 | * | 8/2004 | Stumpf et al. | 707/5 |
| 2002/0143795 | A1 | * | 10/2002 | Fletcher et al. | 707/200 |

FOREIGN PATENT DOCUMENTS

| CA | 2305122 A1 | * | 1/2001 |
| EP | 0877325 A1 | * | 11/1998 |

* cited by examiner

Primary Examiner—Frantz Coby

(57) ABSTRACT

Embodiments of the present invention provide an ad-hoc query engine. The ad-hoc query engine comprises a query management module, a metadata module, a data cache module and a viewer module. The query management module receives a query request from a client device. The query request is specified in terms of a plurality of business objects. The query management module utilizes the metadata module to translate the business objects into a structured query language statement as a function of the content of the data cache module. The SQL statement comprises a plurality of aggregation. The query management module dynamically causes each aggregation to be re-directed to execute against the content of the data cache module, when the aggregation is locally or linearly computable from said content of said data cache module. The query management utilizes the viewer module to generate a report as a function of the results of the executed SQL statement.

24 Claims, 6 Drawing Sheets

410 — SELECT STORE.CITY, STORE.REGION, SUM(SALES_FACT.PROFIT),
        SUM(SALES_FACT.SALES),
        SUM(SALES_FACT.PROFIT)/SUM(SALES_FACT.SALES),
        COUNT(DISTINCT CUSTOMER.CUSTOMER.ID)
415 — FROM VIDEO4.SALES_FACT SALES_FACT, VIDEO4.STORE STORE,
        VIDEO4.CUSTOMER CUSTOMER
420 — WHERE STORE.CITY IN ('CHICAGO', 'CINCINNATI', 'Atlanta', 'Boston')
        AND (STORE.STORE_KEY = SALES_FACT.STORE_KEY) AND
        (CUSTOMER.CUSTOMER.KEY = SALES_FACT.CUSTOMER_KEY)
425 — GROUP BY GROUPING SETS ((STORE.CITY, STORE.REGION), (STORE.REGION))

FIGURE 4A

| REGION | CITY | PROFIT SUM (430) | SALES SUM (435) | PROFIT SUM/ SALES SUM (440) | COUNT (DISTINCT CUSTOMER_ID) (445) |
|---|---|---|---|---|---|
| CENTRAL | | | | | |
| | CHICAGO | $157,644.21 | $254,512.45 | 0.62 | 675 |
| | CINCINNATI | $35,797.83 | $50,347.50 | 0.71 | 309 |
| EAST | | $121,846.38 | $204,164.95 | 0.60 | 429 |
| | ATLANTA | $102,330.95 | $185,509.51 | 0.55 | 664 |
| | BOSTON | $37,117.26 | $93,476.72 | 0.40 | 361 |
| | | $65,213.69 | $92,032.79 | 0.71 | 358 |

FIGURE 4B

ENHANCED AD-HOC QUERY AGGREGATION

FIELD OF THE INVENTION

Embodiments of the present invention relate to relational database systems, and more particularly to providing ad-hoc querying.

BACKGROUND OF THE INVENTION

Relational databases, according to the conventional art, can be utilized to store vast amounts of data. Efficiently capturing and manipulating the data into information is becoming more critical as storage capacity and computing power increases. The capturing of data and the manipulation of data to obtain information typically involves competing design considerations.

Accordingly, database systems delivering very large storage capacity and performant data querying typically comprise a data capture server, a database and an application server. The data capture server is dedicated to capturing data and saving it in the database. The application server is dedicated to running queries against the data saved in the database.

Referring to FIG. 1 a block diagram of an online analytic processing (OLAP) 110 type application server and a relational online analytic processing (ROLAP) 120 type application server according to the conventional art is shown. As depicted in FIG. 1, the ROLAP system 120 runs queries directly against either an online transaction processing (OLTP) type source database 130 or a data warehouse type source database 140. The ROLAP 120 type application server provides access to the most recently available data in the source database 130, 140. However, the performance of the system is reduced as a result of such queries running against the source database 130, 140. Furthermore, the end-user typically needs to be proficient with structured query language (SQL), or the like, to generate the particular report they desire.

The OLAP system 110 retrieves a pre-computed query from a data cube 150 in response to a query request from an end user. The data cube 150 is populated with a plurality of queries. The plurality of queries are pre-computed from either the OLTP database 130 or the data warehouse database 140. The OLAP 110 type application server provides increased performance by allowing queries to be pre-computed during times of low system utilization. Pre-computing the queries also typically relieves the end user from being versed in SQL. However, the data provided to the user is only as current as the last update of the pre-computed query results. Furthermore, if an end user desires a query that has not been pre-computed, they typically need an administrator to generate an appropriate query in SQL.

SUMMARY OF THE INVENTION

Embodiments of the present invention provide an ad-hoc query engine. In one embodiment of the present invention, the ad-hoc query engine comprises a query management module, a metadata module, a data cache module and a viewer module. The query management module receives a query request from a client device. The query request is specified in terms of a plurality of business objects. The query management module utilizes the metadata module to translate the business objects into a structured query language (SQL) statement as a function of the content of the data cache module. The SQL statement comprises a plurality of aggregation. The query management module dynamically causes a given aggregation to be re-directed to execute against the content of the data cache module, when the given aggregation is locally or linearly computable from said content of said data cache module. The query management utilizes the viewer module to generate a report as a function of the results of the executed SQL statement.

Embodiments of the present invention also provide a method of generating and performing an ad-hoc query. In one embodiment of the present invention, the method comprises receiving a query request comprising a base aggregation and a higher order aggregation. The base aggregation is executed against a source database and the results are stored in a data cache. It is determined if said higher order aggregation is locally or linearly computable from the base data. If the higher order aggregation is not locally or linearly computable from said base data, the higher order aggregation is executed against the source database. If the higher order aggregation is locally or linearly computable from said base data, the higher order aggregation is executed against the data cache. A report is then generated as a function of the results of execution of the base aggregation and the higher order aggregation. The method may further comprise executing said base aggregation and said higher order aggregation as a single data pull from the source data base, if the higher order aggregation is not locally or linearly computable from said base data.

Accordingly, embodiments of the present invention advantageously perform dynamic redirection of higher levels of aggregations. When an aggregation is redirected, the calculation is performed locally on base data contained in the data cache module. Therefore, source database utilization is reduced, as a result of the analytic not being performed by the source database. In addition, a base aggregation will regularly be utilized by other query request. Therefore, reuse of the base data may also advantageously reduce system utilization because repetitive trips to the source database can be eliminated.

Furthermore, embodiments of the present invention also advantageously pull back multiple aggregation levels from the source database in a single operation. Therefore, all data pulls from the source database are done at once, such that utilization of the source database is further reduced.

BRIEF DESCRIPTION OF THE DRAWINGS

The present invention is illustrated by way of example and not by way of limitation, in the figures of the accompanying drawings and in which like reference numerals refer to similar elements and in which:

FIGS. 4A and 4B show an exemplary SQL statement and a corresponding report, in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
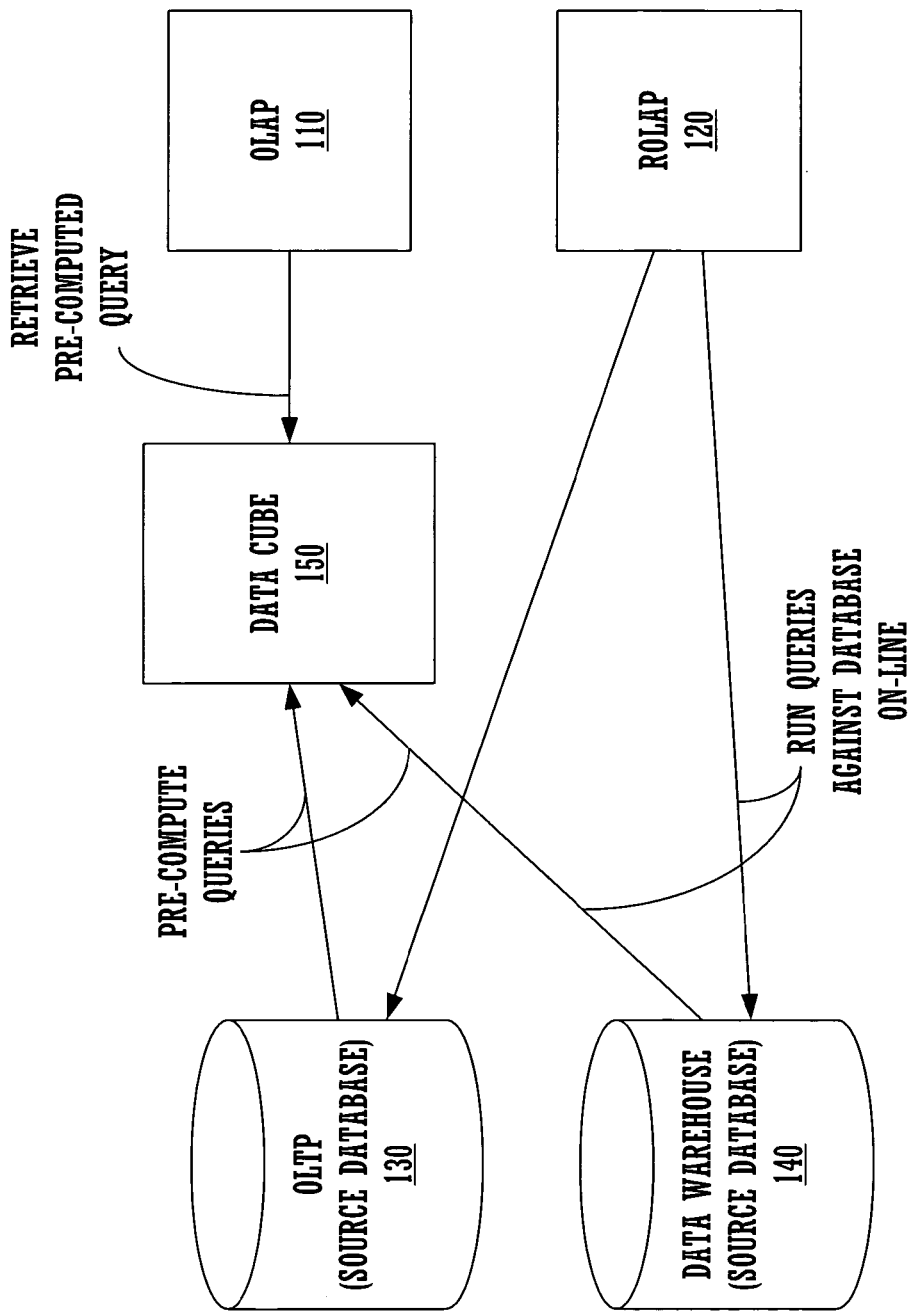
FIG. 1 shows a block diagram of an online analytic processing (OLAP) type application server and a relational online analytic processing (ROLAP) type application server according to the conventional art.
Figure 2:
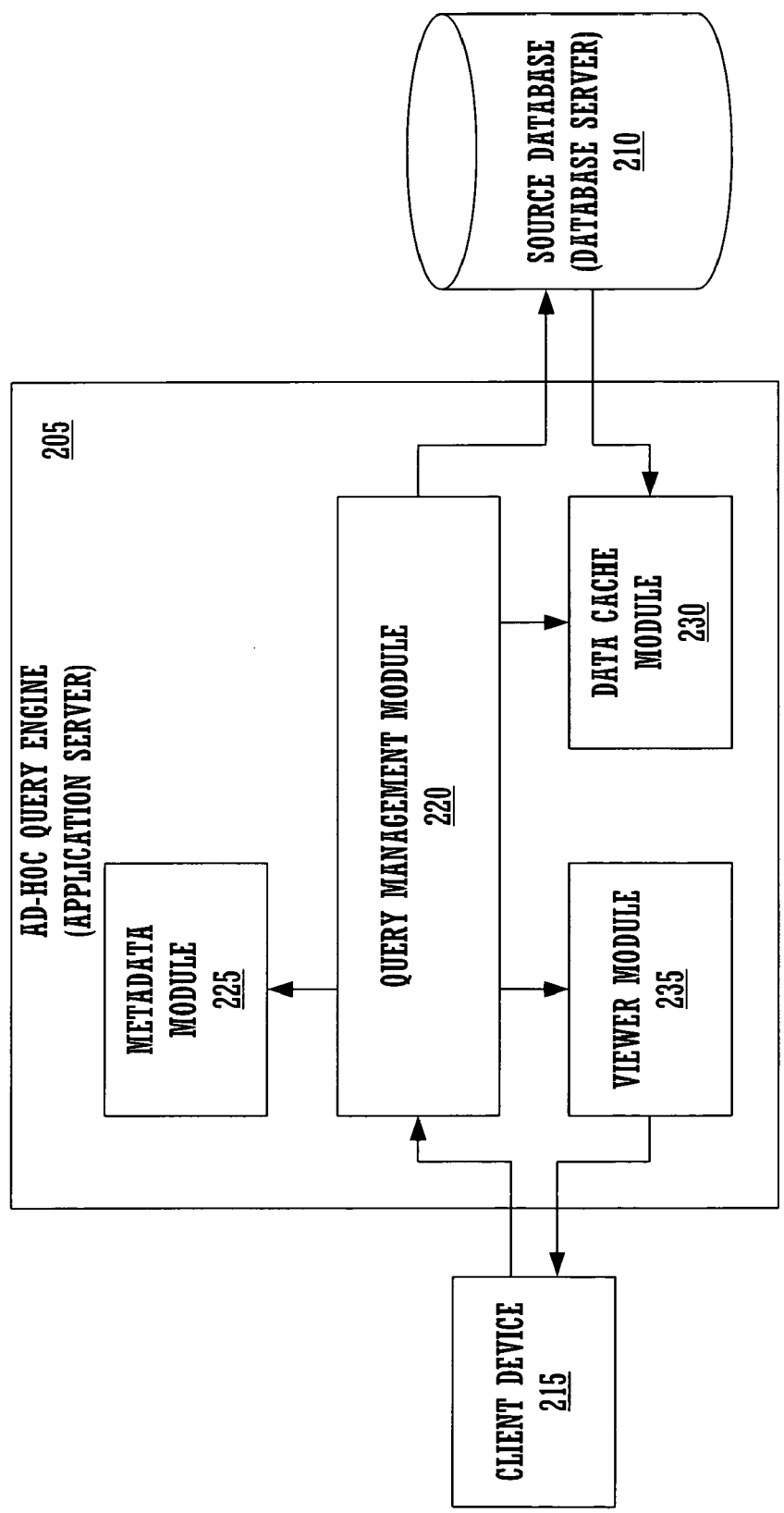
FIG. 2 shows a block diagram of an ad-hoc query engine 205, in accordance with one embodiment of the present invention.

Referring now to FIG. 2, a block diagram of an ad-hoc query engine 205, in accordance with one embodiment of the present invention, is shown. As depicted in FIG. 2, the ad-hoc query engine 205 is communicatively coupled between a source database 210 and a client device 215 and/or web-enabled device. The ad-hoc query engine 205 comprises a query management module 220, a metadata module 225, a data cache module 230, and a viewer module 235.

An end user, utilizing the client device 215, may submit a query request to the application server 205 and receives a corresponding report therefrom. The user may phrase the query request in terms of one or more business objects.

The query management module 220 translates the query request into one or more structured query language (SQL) statements utilizing the metadata module 225. The metadata module 225 links the structure of the source database 210 to applicable business objects, which may be utilized in the query request. Business objects can represent one or more subject areas, simplifying tables and columns into easy to understand folders and items of data. The business objects are phrased in business terms. For example, a user will specify a query request with "product code" rather than "app prod desc.prod cd". Analytic support may be provided through concepts such as hierarchies, default formats, display properties, and lists of values that can be applied to query selection, conditions and parameters. Even advanced concepts such as calculations, analytics, conditions, joins, and even complex queries may be represented as business objects. The metadata module 225 may be located in the ad-hoc query engine 205 or may be located in the source database 210. The metadata module 225 may be configured by an administrator upon initialization of the ad-hoc query engine 205.

For example, a user may request sales information such as "total sales, total profits, total profits per total sales, and the number of accounts, for each city." The query management engine 220 utilizes the metadata module 225 to translate the business logic terms of the query request into statements for pulling base data (e.g., profit, sales, stores and customer identifiers) from applicable tables (e.g., sales facts, store, and customers).

The query management module 220 also checks the content of the data cache module 230, while generating the SQL statement. If the base data necessary for a given aggregation already resides in the data cache module 230, the SQL statement is directed to run against the base data contained in the data cache module 230. Hence, the given aggregation is performed locally (e.g., on the data cache module 230). If the base data necessary for a given aggregation does not reside in the data cache module 230, the SQL statement is directed to run against the source database. Hence, the given aggregation is performed on data as it is pulled from the source database 210.

More specifically, if the calculation is linear or locally computable from data contained in the cache data module 230, the query management engine 220 aggregates the base data in the cache data module 230 to compute the higher level of aggregation. If the calculation is non-linear or not locally computable from data contained in the data cache module 230, the query management engine 220 pushes the aggregation to the source database 210.

For example, the user may request roll up values based upon region. The profit sum and sales sum for the regions are both linearly computable from the city roll-ups. The profit sum divided by sales sum for the regions is locally computable (e.g., combination of linear and constant) from the city roll-up. However, assuming that a customer may purchase product in more than one city, the rollup value of regional count distinct of customer identifiers is not locally or linearly computable. Therefore, the count distinct of customer identifiers cannot be computed without knowledge of all the unique customer identifiers in each city for a given region. Thus, the query management engine 220 generates an appropriate SQL statement and runs the profit sum, sales sum, profit sum divided by sales sum portions of the SQL statement against the data cache module 230. The query management engine 220 runs the count distinct of customer identifier portion against the source database 210.

In addition, reuse of the base data contained in the data cache module 230 may also advantageously reduce system utilization because repetitive trips to the source database can be eliminated. During operation of the ad-hoc query engine 205, a plurality of query requests and thus the corresponding reports will typically share the same base aggregation levels but have different requirements for higher levels of aggregation. For example, a report with aggregation levels of (year,quarter) and (quarter) can potentially share a cache base aggregation level with a query that contains aggregation levels (year,quarter) and (year).

Furthermore, if the query request comprises a plurality of aggregation levels that are to be pushed to the source database 210, the query management module 220 generates a SQL statement capable of pulling back the multiple aggregations in a single query. In order to pull back multiple aggregations in a single query, a grouping set is utilized in the group by clause of the generated SQL statement. The grouping set element of the group by clause is an extension of SQL. Performing the data pull in a single step may be performed quicker than doing it in multiple steps. The single data pull can be performed quicker because for example, the source database 210 performs joins only once and aggregation context information can be shared when computing multiple aggregation levels.

Finally, the viewer module 235 provides for generating the appropriate report and pushing it to the client device 215. The report is live, enabling the client device to interact with data contained in the report by changing layouts and specifying parameters. It should also be appreciated that the viewer module 235 in combination with the data cache module 230 allows reports to be built quicker because a trip to the source database 210 is not required.

Figure 3:
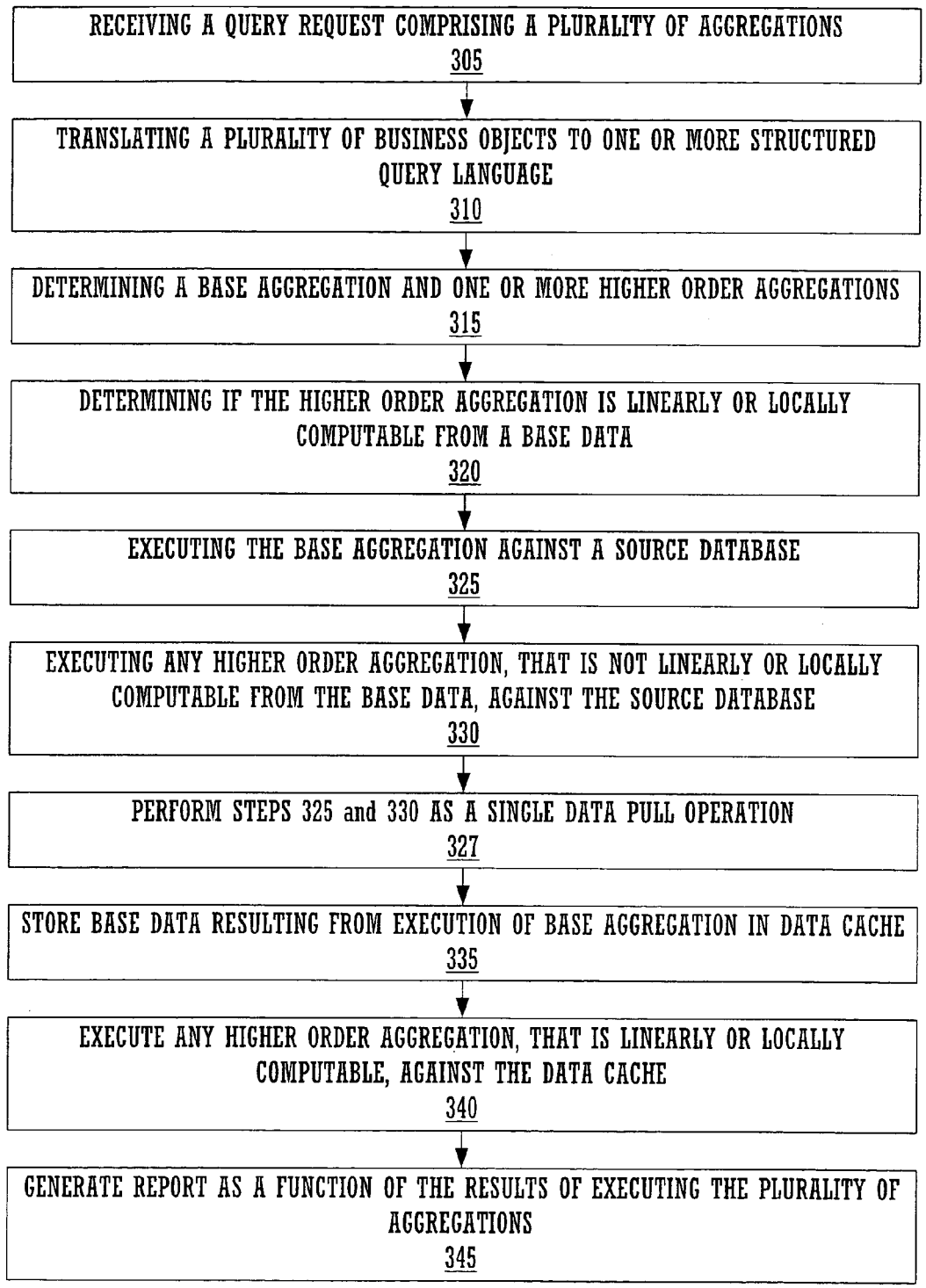
FIG. 3 shows a flow diagram of a method for performing an ad-hoc query, in accordance with one embodiment of the present invention.

Referring now to FIG. 3, a flow diagram of a method for performing an ad-hoc query, in accordance with one embodiment of the present invention, is shown. As depicted in FIG. 3, the method comprises receiving a query request, at step 305. The query request comprises a plurality of aggregations, which may be expressed in terms of business objects.

At optional step 310, a query request expressed in terms of a plurality of business objects is translated into one or more structured query language (SQL) clauses. The translation may be performed utilizing a mapping between various business objects and corresponding SQL clauses. An administrator may initialize the mapping.

At step 315, a base aggregation and one or more higher order aggregations are determined from the plurality of aggregations comprising the query request.

At step 320, for each higher order aggregation of the query request, it is determined if the given higher order aggregation is linearly or locally computable from a base data. An aggregation is locally computable if the calculation can be broken down into linear and constant components that can be evaluated locally. The base data comprises the results that will be returned when the base aggregation is executed. At step 325, the base aggregation is executed against the source database. At step 330, any higher order aggregation that is not linearly or locally computable, from the base data, is executed against the source database.

In an optional step 327, steps 325 and 330 may be executed as a single pull of data from the source database. For example, if a plurality of data pulls from the source database is required, a plurality of grouping sets corresponding to the number of aggregations to be executed against the source database, are specified in the group by clause of the SQL statement. Hence, if the pull from the source database corresponds to a single aggregation, a first set of data is pulled and the aggregation is calculated. If the pull from the source database corresponds to a plurality of levels of aggregation, a first set of data is pulled and a first aggregation is computed, a second set of data is then pulled and a second aggregation is computed, and so on.

At step 335, the base data resulting from the execution of the base aggregation against the source database is stored in a data cache.

At step 340, any higher order aggregation that is linearly or locally computed from the base data stored in the data cache is executed.

For example, execution of the generated SQL statement is dynamically run against cached data and/or the source database. Execution of portions of the SQL statement that are not locally or linearly computable are directed to run against the source database. Execution of portions of the SQL statement that are locally or linearly computable are redirected to run against the cached data.

At step 345, an appropriate report is generated as a function of the results of executing the plurality of aggregations. The report is formatted and output to an end user. One or more elements of the formatting may be specified by one or more optional elements of the query request.

Referring now to FIGS. 4A and 4B, an exemplary structured query language (SQL) statement and a corresponding report, in accordance with one embodiment of the present invention, are shown. The exemplary SQL statement is generated in response to a query request. The query request comprises a plurality of business objects. The query request may for example comprise "total sales by city and region, total profit by city and region, ratio of total profit to total sales by city and region, number of customers by city and region." As depicted in FIG. 4A, the exemplary SQL statement comprises a "select" clause 410 specifying the desired items, a "from" clause 415 specifying the applicable tables in the database, a "where" clause 420 specifying which records are returned as the base data to be saved in a data cache module, and a "group by" clause 425 specifying one or more levels of aggregation.

The grouping set element of the "grouping by" clause 425 is an extension of SQL, which allows the ad-hoc query engine to pullback multiple aggregation levels in a single operation. For example, the group by grouping set of the exemplary query statement allows two levels of aggregation, city and region, to be pulled from the source database.

Assuming that the ad-hoc query engine does not contain the necessary base data, the portion of the exemplary SQL statement pertaining to pulling base data may be run against the source database. For example, sales data for each store, as a function of the store's location by city/region and region, is pulled from the source database and stored in a data cache module.

The portions of the exemplary SQL statement pertaining to a local or linear aggregation may be performed locally upon the base data stored in the data cache module. If the calculation is linear, the ad-hoc engine may linearly aggregate base data values to compute higher levels of aggregation. An example of a linear calculation is profit sum. The rollup values of profit sum for 'East' is computed by adding together the profit sum values for 'Atlanta' and 'Boston.'

If the calculation is locally computable, the calculation can be broken down into linear (e.g., sum function) and constant (e.g., division operator) components that are combined such that they can be evaluated locally. An example of a locally computable calculation is profit sum divided by sales sum. Such a calculation can be broken down into linear components comprising profit sum and sales sum, and a constant component comprising a division operator. Thus, to compute the rollup value of profit sum divided by sales sum for the 'East' region, the ad-hoc query engine computes the rollup values of profit sum and sales sum. The ad-hoc query engine then divides he rollup value of profit sum by the rollup value of sales sum.

A calculation that is not locally computable or linear is pushed into the source database. The source database reevaluates the calculation at the higher level of aggregation and a correct result is generated. For example, the rollup value of count distinct of customer identifiers for the 'East' region may not be computed without knowledge of all the unique customer identifiers in 'Atlanta' and 'Boston.' Therefore, the aggregation for account distinct at the regional level is pushed to the source database.

As depicted in FIG. 4B, the exemplary report comprises the sales information: profit sum 430, sales sum 435, profit sum divided by the sales sum 440 and count 445. A first aggregation level, city 450, and a second level of aggregation, region 455, group the sales information.

Figure 5:
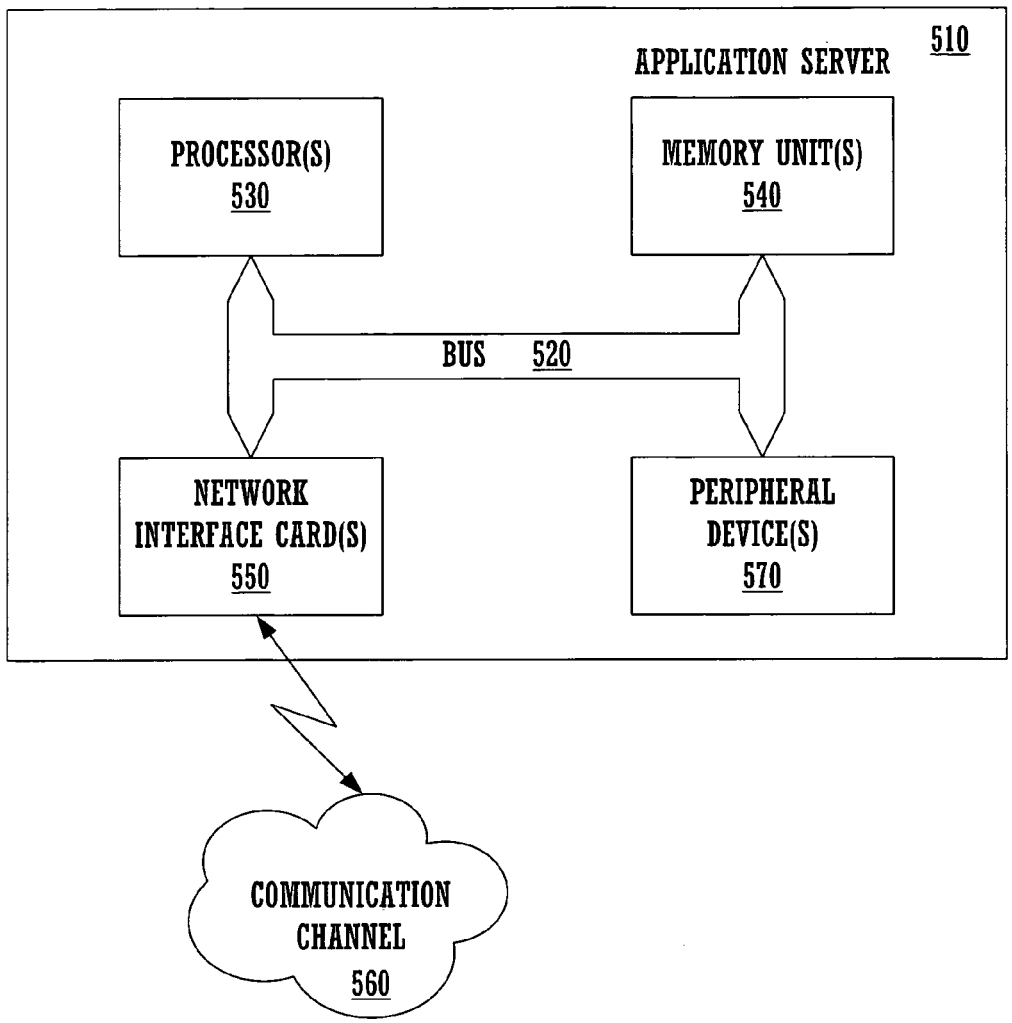
FIG. 5 shows a block diagram of an exemplary application server for performing embodiments of the present invention.

Referring now to FIG. 5, a block diagram of an exemplary application server 510 for performing embodiments of the present invention, is shown. As depicted in FIG. 5, the exemplary application server 510 comprises an address/data bus 520 for communicating information and instructions. One or more processors 530 are coupled with the bus 520 for processing information and instructions.

One or more memory units 540 are also coupled to the bus 520 for storing information and instructions for the processor(s) 530. The memory unit(s) 540 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like.

One or more network interface cards (NIC) 550 are also coupled to the bus 520. The NIC(s) 550 provides for communicating with other network devices across one or more communication channels 560. The other network devices may comprise a client device, a database server and/or the like, Optionally, the exemplary application server 510 may further comprise one or more peripheral devices 570 (e.g., mass data storage device, display, keyboard, pointing device, speaker, and the like) coupled to the bus 520. The peripheral devices 570 may provide for inputting and output information and instructions.

Certain elements of the present invention are realized as a plurality of routines (e.g. instructions and information) that reside on a computer-readable medium such as the memory unit 540, and are executed by the processor 530. When executed, the plurality of routines cause the processor 530 to provide a means for receiving a query request specified in terms of one or more business objects. A means for translating the business terms of the query request into a plurality of aggregations is also provided.

The plurality of routines cause the processor 530 to also provide a means for dynamically redirecting execution of one or more of the plurality of aggregations to run against base data contained in the memory unit 540. The aggregations are redirected, if the aggregation is linearly or locally computable from the base data.

If a given aggregation is not linearly or locally computable from the base data, the processor provides a means for directing one or more of the plurality of aggregations to execute as a single data pull against source data contained in the source database.

Finally, the plurality of routines also cause the processor 530 to provide a means for generating a report as a function the results returned by execution of the plurality of aggregations.

Accordingly, embodiments of the present invention are advantageous in that the ad-hoc query engine's analytic capabilities are increased with the ability to push aggregation calculations that cannot be locally computed at the source database. Pushing aggregation calculations to the source database, according to embodiments of the present invention, is invoked as needed. If an aggregation can be handled locally, the ad-hoc query engine will use the base data contained in a data cache module to locally calculate the aggregation.

Embodiment of the present invention are also advantageous in that a given report can have certain rollup cells that are locally aggregated and other rollup cells that are aggregated in the source database. Hence, embodiments of the present invention advantageously allow the ad-hoc query engine to maximize data cache reuse while still generating reports that display rollup values for all calculations. Furthermore, embodiments of the present invention are also advantageous in that multiple pulls of data from the source database are performed as a single data pull operation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An ad-hoc query engine comprising:
    a data cache module; and
    a query management module coupled to said data cache module and a source database, wherein said query management module dynamically causes an aggregation to be re-directed to execute against a content of said data cache module when said aggregation is linearly computable from said content of said data cache module.

2. The ad-hoc query engine according to claim 1, wherein said query management module dynamically causes said aggregation to be re-directed to execute against said content of said data cache module when said aggregation is locally computable from said content of said data cache module.

3. The ad-hoc query engine according to claim 1, wherein said query management module causes a plurality of aggregations that are directed to execute against said source database to be executed in a single data pull from said source database.

4. The ad-hoc query engine according to claim 1, further comprising a metadata module coupled to said query management module, wherein said query management module causes said metadata module to translate a business object into a structured query language (SQL) clause.

5. The ad-hoc query engine according to claim 4, wherein a query request is expressed in terms of said business object.

6. The ad-hoc query engine according to claim 1, wherein said aggregation is expressed in terms of said (SQL) clause.

7. The ad-hoc query engine according to claim 1, further comprising a viewer module, wherein said query management module causes said viewer module to generate a report as a function of a result obtained from execution of said aggregation.

8. A method of generating and performing an ad-hoc query, comprising:
    receiving a query request comprising a base aggregation and a higher order aggregation;
    determining if said higher order aggregation is locally computable from a base data resulting from executing said base aggregation;
    executing said base aggregation against a source database;
    storing said base data, resulting from said executing said base aggregation against said source database, in a data cache;
    executing said higher order aggregation against said source database, if said higher order aggregation is not linearly computable from said base data;
    executing said higher order aggregation against said data cache, if said high order aggregation is linearly computable from said base data stored in said data cache; and
    generating a report as a function of said executing said base aggregation and said higher order aggregation.

9. The method according to claim 8, wherein said query request, comprising a base aggregation and a higher order aggregation, is expressed in terms of a plurality of business objects.

10. The method according to claim 9, further comprising translating said plurality of business objects into a plurality of structured query language (SQL) clauses.

11. The method according to claim 10, wherein said plurality of SQL clauses provide for said executing said base aggregation and said executing said higher order aggregation.

12. The method according to claim 8, wherein said executing said base aggregation against a source database and said executing said higher order aggregation against said source database, if said higher order aggregation is not linearly computable from said base data, are performed as a single data pull from said source database.

13. The method according to claim 12, wherein a group by clause of a SQL statement, comprising a first grouping set for said base aggregation and a second grouping set for said higher order aggregation, provide for said executing said base aggregation and said executing said higher order aggregation as said single data pull.

14. An application server comprising:
a bus;
a processor, communicatively coupled to said bus, for executing a series of routines which when executed by said processor provide a means for dynamically redirecting execution of an aggregation against a source data to a base data when said aggregation is locally calculable from said base data;
a memory unit communicatively coupled to said bus; and
a network interface card, communicatively coupled to said bus, for communicating with a source database across a communication channel.

15. The application server according to claim 14, wherein said base data is stored as a first portion of said information in said memory unit.

16. The application server according to claim 14, wherein said source data is stored in said source database.

17. The application server according to claim 14, wherein said processor further provides a means for directing a plurality of other aggregations to execute against said source database as a single pull of data from said source database.

18. The application server according to claim 14, wherein said processor further provides a means for generating a report as a function of said aggregation.

19. The application server according to claim 14, wherein said processor further provides a means for translating a business object of a query request into said aggregation.

20. A computer-readable medium containing one or more sequences of instructions which when execute by an application server cause the application server to implement a method of providing an ad-hoc query, comprising:
receiving a query request comprising a plurality of business objects;
translating said plurality of business objects into a plurality of structured query language (SQL) clauses;
generating a SQL statement as a function of said plurality of SQL clauses;
executing a first portion of said SQL statement against a base data, wherein said first portion of said SQL statement is linearly calculable from said base data; and
pushing execution of a second portion of said SQL statement to a source database, wherein said second portion of said SQL statement is not linearly calculable from said base data.

21. The method of providing an ad-hoc query according to claim 20, further comprising executing said first portion of said SQL statement against said base data, wherein said first portion of said SQL statement is locally calculable from said base data.

22. The method of providing an ad-hoc query according to claim 20, further comprising pushing execution of said second portion of said SQL statement to said source database, wherein said second portion of said SQL statement is not locally calculable from said base data.

23. The method of providing an ad-hoc query according to claim 20, further comprising pushing execution of a third portion of said SQL statement to said source database, wherein execution of said third portion of said SQL statement by said source database returns said base data.

24. The method of providing an ad-hoc query according to claim 23, wherein execution of said first portion and said third portion of said SQL statement is performed as a single data pull from said source database.

* * * * *